United States Patent
Hastings et al.

(10) Patent No.: US 6,182,143 B1
(45) Date of Patent: Jan. 30, 2001

(54) PUBLISH AND SUBSCRIBE DATA PROCESSING APPARATUS, METHOD AND COMPUTER PROGRAM PRODUCT WITH USE OF A STREAM TO DISTRIBUTE LOCAL INFORMATION BETWEEN NEIGHBORS IN A BROKER STRUCTURE

(75) Inventors: Andrew Blair Hastings, Pittsburgh; Shankar Ramaswamy, Bethal Park; Donald Edwin Schmitz, Pittsburgh; Qinhua Wang, Pittsburgh; Michael Wayne Young, Pittsburgh, all of PA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/104,811

(22) Filed: Jun. 25, 1998

(51) Int. Cl.[7] ................................................ G06F 15/16
(52) U.S. Cl. .............................. 709/231; 709/224; 707/1; 707/6
(58) Field of Search .............................. 706/62; 709/224, 709/231; 707/6, 1

(56) References Cited

U.S. PATENT DOCUMENTS

| | | | |
|---|---|---|---|
| 5,867,799 | * | 2/1999 | Lang et al. ................................. 707/1 |
| 5,983,214 | * | 11/1999 | Lang et al. ................................. 707/1 |
| 5,987,460 | * | 11/1999 | Niwa et al. ................................. 707/6 |
| 5,999,975 | * | 12/1999 | Kittaka et al. ........................... 709/224 |
| 6,014,654 | * | 1/2000 | Ariyoshi ................................. 706/62 |

* cited by examiner

Primary Examiner—Le Hien Luu
Assistant Examiner—Farzaneh Farah
(74) Attorney, Agent, or Firm—Jeanine S. Ray-Yarletts

(57) ABSTRACT

A publish/subscribe data processing broker apparatus has: a means for receiving from a publisher application data messages published on a subject-specific stream by the publisher application; and a means for distributing the received published data messages to a subscriber application which has requested to receive messages on the stream upon which the published messages were published, the means for distributing including a plurality of connected distribution agent data processing units; wherein one of the streams is reserved for messages published by a publishing distribution agent data processing unit and intended for receipt by a subscribing distribution agent data processing unit located adjacent the publishing distribution agent data processing unit or intended for receipt by a subscriber application located adjacent the publishing distribution agent data processing unit.

5 Claims, 3 Drawing Sheets

PUBLISH AND SUBSCRIBE DATA PROCESSING APPARATUS, METHOD AND COMPUTER PROGRAM PRODUCT WITH USE OF A STREAM TO DISTRIBUTE LOCAL INFORMATION BETWEEN NEIGHBORS IN A BROKER STRUCTURE

FIELD OF THE INVENTION

The present invention relates to the field of data processing and more specifically to data processing which distributes messages from suppliers (called, hereinafter, "publishers") of data messages to consumers (called, hereinafter "subscribers") of such messages.

BACKGROUND OF THE INVENTION

Publish/subscribe data processing systems have become very popular in recent years as a way of distributing data messages from publishing computers to subscribing computers. The increasing popularity of the Internet, which has connected a wide variety of computers all over the world, has helped to make such publish/subscribe systems even more popular. Using the Internet, a World Wide Web browser application (the term "application" or "process" refers to a software program, or portion thereof, running on a computer) can be used in conjunction with the publisher or subscriber in order to graphically display messages. Such systems are especially useful where data supplied by a publisher is constantly changing and a large number of subscribers needs to be quickly updated with the latest data. Perhaps the best example of where this is useful is in the distribution of stock market data.

In such systems, publisher applications of data messages do not need to know the identity or location of the subscriber applications which will receive the messages. The publishers need only connect to a publish/subscribe distribution agent process, which is included in a group of such processes making up a broker system (referred to hereafter as a broker), and send messages to the distribution agent process, specifying the subject of the message to the distribution agent process. The distribution agent process then distributes the published messages to subscriber applications which have previously indicated to the broker that they would like to receive data messages on particular subjects. Thus, the subscribers also do not need to know the identity or location of the publishers. The subscribers need only connect to a distribution agent process.

One such publish/subscribe system which is currently in use is shown in FIG. 1. Publishers 11 and 12 connect to the publish/subscribe broker 2 and send published messages to broker 2 which distributes the messages to subscribers 31, 32, 33, 34. Publishers 11 and 12, which are data processing applications which output data messages, connect to broker 2 using the well known inter-application data connection protocol known as remote procedure call (or RPC). Each publisher application could be running on a separate machine, alternatively, a single machine could be running a plurality of publisher applications. The broker 2 is made up of a plurality of distribution agents (21 through 27) which are connected in a hierarchial fashion which will be described below as a "tree structure". These distribution agents, each of which could be running on a separate machine, are data processing applications which distribute data messages through the broker 2 from publishers to subscribers. Subscriber applications 31, 32, 33 and 34 connect to the broker 2 via RPC in order to receive published messages.

Publishers 11 and 12 first connect via RPC directly to a root distribution agent 21 which in turn connects via RPC to second level distribution agents 22 and 23 which in turn connect via RPC to third level distribution agents 24, 25, 26 and 27 (also known as "leaf distribution agents" since they are the final distribution agents in the tree structure). Each distribution agent could be running on its own machine, or alternatively, groups of distribution agents could be running on the same machine. The leaf distribution agents connect via RPC to subscriber applications 31 through 34, each of which could be running on its own machine.

In order to allow the broker 2 to determine which published messages should be sent to which subscribers, publishers provide the root distribution agent 21 with the name of a distribution stream for each published message. A distribution stream (called hereinafter a "stream") is an ordered sequence of messages having a name (e.g., "stock" for a stream of stock market quotes) to distinguish the stream from other streams. Likewise, subscribers provide the leaf distribution agents 31 through 34 with the name of the streams to which they would like to subscribe. In this way, the broker 2 keeps track of which subscribers are interested in which streams so that when publishers publish messages to such streams, the messages can be distributed to the corresponding subscribers. Subscribers are also allowed to provide filter expressions to the broker in order to limit the messages which will be received on a particular stream (e.g., a subscriber 31 interested in only IBM stock quotes could subscribe to the stream "stock" by making an RPC call to leaf distribution agent 24 and include a filter expression stating that only messages on the "stock" stream relating to IBM stock should be sent to subscriber 31).

Oftentimes, it is necessary for a distribution agent to inform its "children" (i.e., the distribution agents directly underneath the distribution agent) of some event, so that the children can take some appropriate action. For example, if distribution agent 22 should lose its connection to its parent (the root distribution agent 21), distribution agent 22 needs to inform its children distribution agents 24 and 25 so that such children can take an appropriate action which has been pre-configured by the systems administrator (e.g., the distribution agents 24 and 25 could either try to connect to another parent, such as distribution agent 23, or they could simply stay with distribution agent 22 and wait until distribution agent 22 regains its connection with the root distribution agent 21).

In the prior art publish/subscribe broker, this type of communication between a parent distribution agent and its children has involved the parent having to send a dedicated command, outside of the normal publish/subscribe message flow. This increases the types of traffic flowing between distribution agents. Further, one child may receive messages in a different order as compared to one of its siblings, due to the fact that the parent must send separate commands to each child. Accordingly, the prior state of the art in this area has resulted in an inefficient use of available resources and a generally unsatisfactory architectural approach.

SUMMARY OF THE INVENTION

According to one aspect, the present invention provides a publish/subscribe data processing broker apparatus having: a means for receiving from a publisher application data messages published on a subject-specific stream by the publisher application; and a means for distributing the received published data messages to a subscriber application which has requested to receive messages on the stream upon which the published messages were published, the means for distributing including a plurality of connected distribution agent data processing units; wherein one of the streams is reserved for messages published by a publishing distribution agent data processing unit and intended for receipt by a subscribing distribution agent data processing unit located adjacent the publishing distribution agent data processing unit or intended for receipt by a subscriber application located adjacent the publishing distribution agent data processing unit.

According to a second aspect, the present invention provides a publish/subscribe data processing broker apparatus having: a means for receiving from a publisher application data messages published on a subject-specific stream by the publisher application; and a means for distributing the received published data messages to a subscriber application which has requested to receive messages on the stream upon which the published messages were published, the means for distributing including a plurality of distribution agent data processing units arranged in a hierarchial structure including a plurality of ordered levels including a top level closest to publisher applications and a bottom level closest to subscriber applications; wherein one of the streams is reserved for messages published by a publishing distribution agent data processing unit located at one level of the hierarchy and intended for receipt by a subscribing distribution agent data processing unit located at a neighboring level of the hierarchy or intended for receipt by a subscriber application if the publishing distribution agent data processing unit is located at the bottom level of the hierarchy.

Preferably, upon receipt of a message published on the reserved stream, the subscribing distribution agent data processing unit or subscriber application takes a predetermined action depending on the contents of the received published message. Further preferably, at least one of the publisher application or the subscriber application makes use of an Internet World Wide Web browser program to allow published messages to be sent or received over the Internet.

The present invention reuses the existing stream architecture in order to enable communication between neighboring distribution agents (and between a distribution agent and its directly connected subscribers). Therefore, it is not necessary to use a separate communication type for such communication, resulting in a highly efficient use of available system resources.

Further, data messages from, for example, a parent distribution agent to its children are always delivered in order on a stream thus ensuring that all such messages are received in the exact same order by each such child, thus serving to provide a high degree of stability and predictability of result.

According to a third and a fourth aspect, the present invention provides a data processing method having method steps corresponding to each element of the data processing apparatus of the first and second aspect, respectively, of the invention.

According to a fifth and sixth aspect, the present invention provides a computer readable storage medium having a computer program stored on it which, when executed on a computer, carries out the functionality of data processing method of the third and fourth aspect, respectively, of the invention.

BRIEF DESCRIPTION OF THE DRAWINGS

The invention will be better understood by referring to the detailed description of the preferred embodiments which will now be described in conjunction with the following drawing figures.

DETAILED DESCRIPTION OF THE PREFERRED EMBODIMENTS

Figure 1:
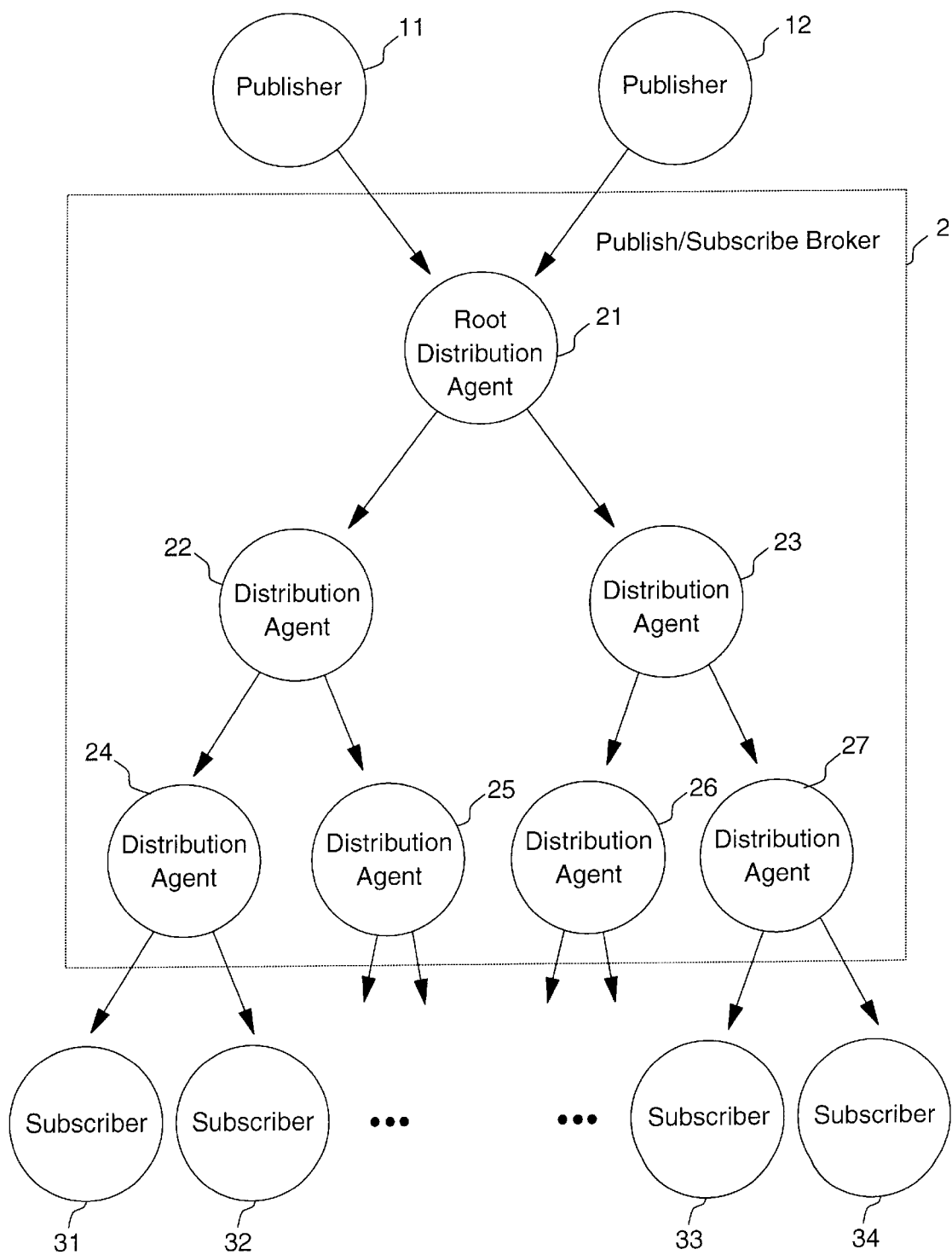
FIG. 1 shows the architecture of the publish/subscribe system to which the preferred embodiment of the present invention relates.

In FIG. 1 a publisher application 11, running on one computer, is, for example, a supplier of live stock market data quotes. That is, publisher application 11 provides up to the minute messages stating the present value of share prices. In this example, publisher application 11 is publishing messages on a stream called "stock" which has already been configured in the broker 2. As is well known, when publisher 11 wishes to publish a stock quote message to stream "stock", publisher 11 makes an RPC call to the root distribution agent 11 which is at the top level of the broker tree structure. In this example, subscriber application 32, running on another computer, has sent a subscription request via an RPC call to leaf distribution agent 24, which is at the bottom level of the tree structure, indicating that subscriber 32 would like to subscribe to stream "stock".

Thus, whenever publisher 11 publishes a data message to stream "stock" the distribution tree structure of broker 2 channels the message down through the root distribution agent 21, through any intermediary distribution agents (e.g., 22 in the example of FIG. 1) and through the leaf distribution agent 24 to the subscriber 32. This involves a series of RPC calls being made between each successive circle in the diagram of FIG. 1 connecting publisher 11 and subscriber 32 (i.e., 11 to 21, 21 to 22, 22 to 24 and 24 to 32).

This, so far, describes the operation of the prior art publish/subscribe broker. The preferred embodiment of the present invention will now be described.

If distribution agent 22 has lost its connection to its parent (i.e., root distribution agent 21), then this means that the distribution agents 24 and 25, which are children of distribution agent 22, will not be able to receive any further data messages until distribution agent 22 regains its connection to root distribution agent 21. Of course, this also means that subscribers 31 and 32 connected to distribution agent 24 (and any subscribers connected to distribution agent 25) also will not receive any data messages. Distribution agent 22 must inform its children 24 and 25 of the connection loss so that the children can take an appropriate action (such as connecting to a sibling of distribution agent 22 such as distribution agent 23). The specifics of which appropriate action should be taken by the children will have been specified in advance by the systems administrator as a preconfigured policy.

Figure 2:
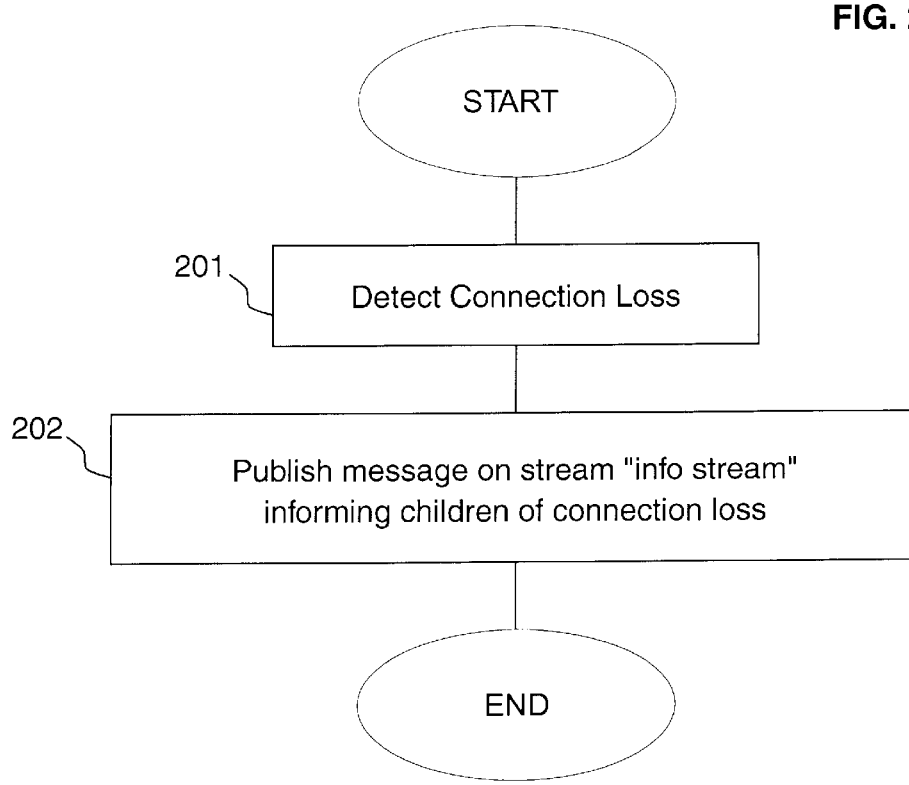
FIG. 2 is a flowchart showing the steps taken by a parent distribution agent, according to a preferred embodiment of the present invention.

The operational steps taken by distribution agent 22, according to a preferred embodiment of the present invention, are illustrated by the flowchart of FIG. 2.

At step 201, distribution agent 22 detects the fact that it has lost its connection to its parent (the root distribution agent 21). At step 202, distribution agent 22 publishes a message on a stream called "infostream" which is reserved for use in communicating information between a parent distribution agent and its children. only distribution agents can act as publishers on this stream, and a security check is made to determine whether a publisher is a distribution agent before a publisher is allowed to publish on this stream. Whenever a new child (be it a distribution agent or a subscriber) connects to a distribution agent (which is that child's parent) the child subscribes to the stream "infostream", so that the child can easily receive messages from its parent distribution agent. The message which distribution agent 22 publishes at step 202 informs the agent 22's children 24 and 25 of the fact that agent 22 has lost its connection to agent 21.

Figure 3:
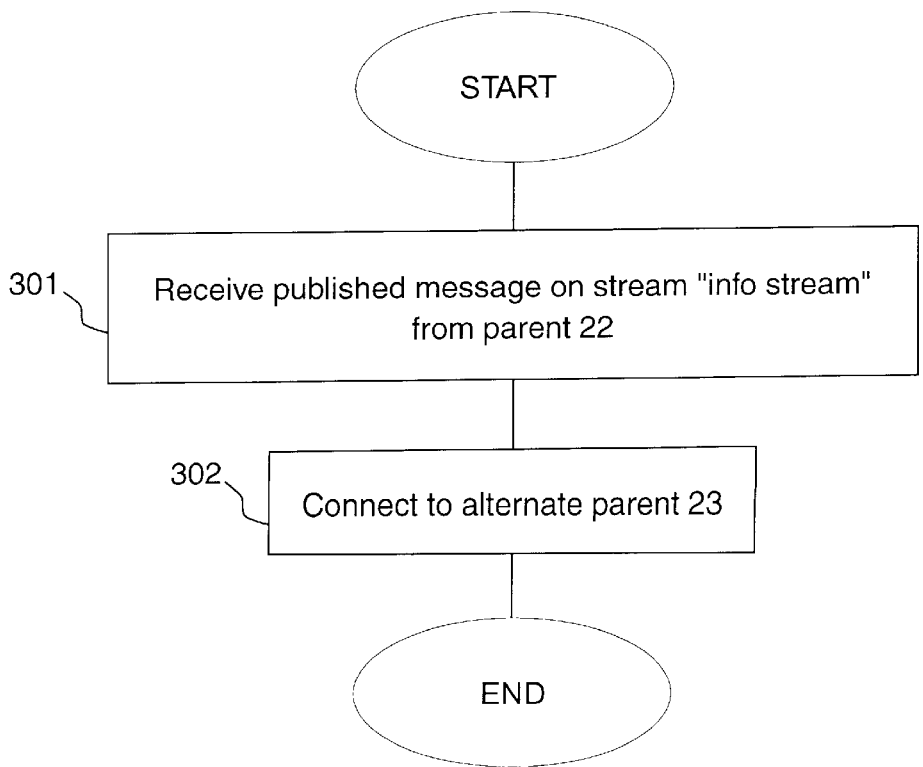
FIG. 3 is a flowchart showing the steps taken by children distribution agents, according to a preferred embodiment of the present invention.

The operational steps taken by children distribution agents 24 and 25 upon receiving the message published by parent distribution agent 22 at step 202, according to a preferred embodiment of the present invention, are illustrated by the flowchart of FIG. 3.

Figure 4:
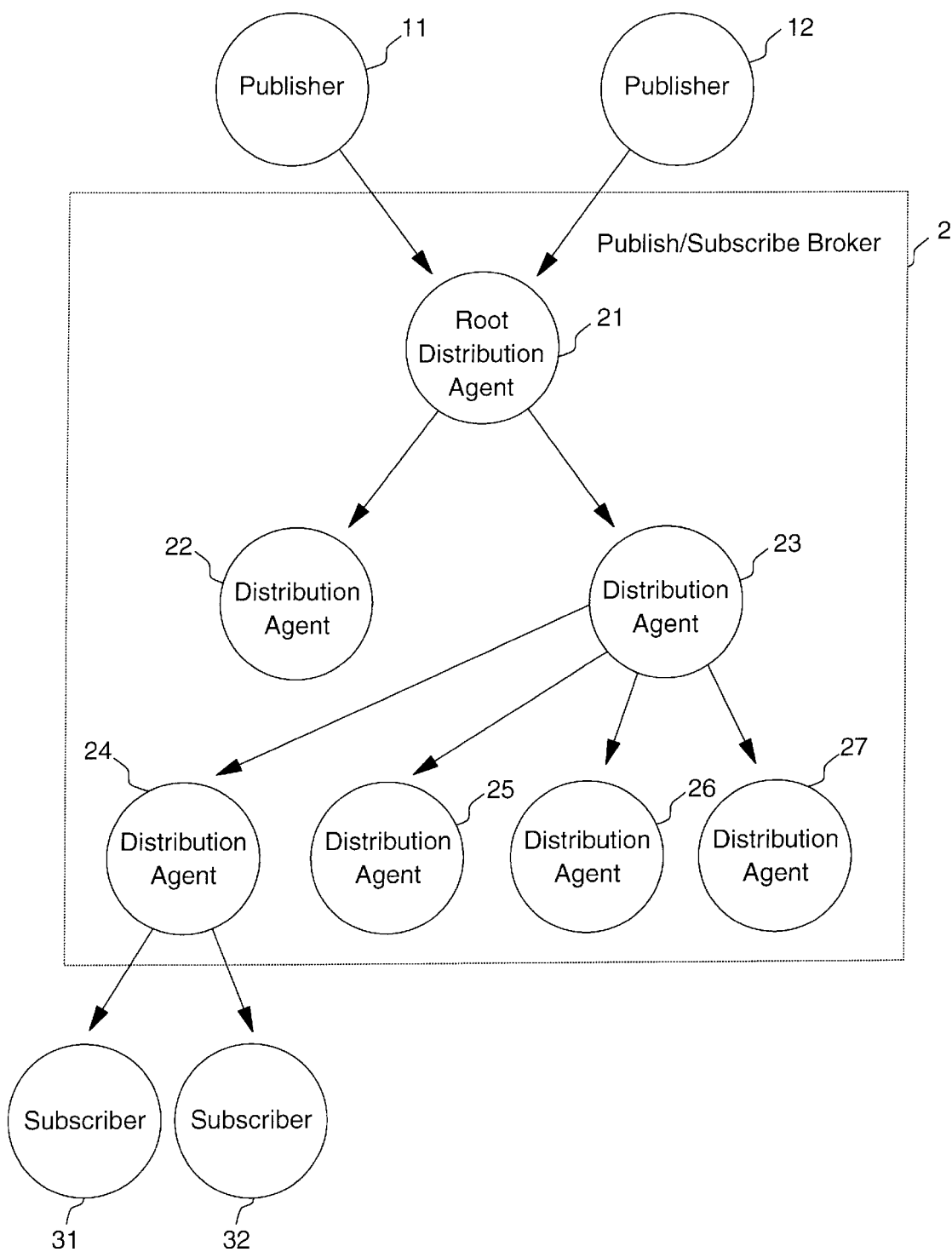
FIG. 4 shows an alternate version of the broker architecture of FIG. 1 after the steps in the flowcharts of FIGS. 2 and 3 are executed.

At step 301, the children distribution agents 24 and 25 receive the message published by parent distribution agent 22. This is carried out by the parent distribution agent 22 initiating an RPC call to each child distribution agent 24 and 25. The children distribution agents have previously subscribed to the stream "infostream" when they first joined the tree as children of distribution agent 22. At step 302, the children distribution agents 24 and 25 follow a preconfigured policy set by the systems administrator in order to inform the agents 24 and 25 as to what to do if they receive a message on stream "infostream" from their parent telling them that the parent has lost its connection to its parent. In this example, the preconfigured policy is that in this case the children distribution agents should connect to an alternate parent 23 which is a sibling of the original parent 22 which has lost its connection to its parent 21. Thus, agents 24 and 25 make an RPC call to agent 23 (which will in turn make an RPC call to root distribution agent 21) requesting that any published messages which would have been sent to agents 24 and 25 via agent 22 should now be sent via agent 23. A modified version of the publish/subscribe broker 2's tree structure illustrating this change is shown in FIG. 4.

It should be noted that an alternative policy which the children could follow after step 301 would be to simply wait until the parent agent 22 has regained its connection to root agent 21. However, this policy results in subscribers 31 and 32 experiencing a delay in receiving messages while the connection loss exists. When the connection is again established, the messages published while the connection was down can be retrieved from persistent storage (maintained by root agent 21) and then sent to subscribers 31 and 32 via agents 22 and 24.

In the above example of the use of the stream "infostream" to communicate between a parent and its children, a parent sent a message to each of its children. As with other streams in the distribution tree, a parent can also select which of its children to send a particular message to on stream "infostream" depending on the nature of the message being sent. For example, another use of the stream "infostream" is where a parent distribution agent 24 wishes to inform a subscriber 31 (which is a child of agent 24) that the subscriber 31 has lost its authority to receive messages on a stream (e.g., the "stock" stream). This could be, for example, where a company has reorganized and made changes as to who is allowed to view certain data. On the other hand, the subscriber 32 has not lost its authority to receive messages on this stream. Thus, the parent 24 publishes a message to only subscriber 31 via RPC on stream "infostream" with a message content that informs subscriber 31 that subscriber 31 is no longer authorized to receive messages on the stream (e.g., the "stock" stream). In this case, there is no particular response which the subscriber must take upon receiving this message. However, the subscriber 31 is clearly informed that it is not to expect any more messages on the "stock" stream.

A still further use of the "infostream" stream is in a load balancing situation. Assume a leaf distribution agent 24 is very busy sending messages to one of its children (subscriber 31), that is, there is a heavy load of messages going to subscriber 31. Parent distribution agent 24 could publish a message on stream "infostream" telling its other child (subscriber 32) to connect to distribution agent 25 temporarily during the period of heavy traffic to subscriber 32. Subscriber 32 would then connect to agent 25 by making an RPC call thereto. At a later time, should agent 25 become overburdened due to the extra load, agent 25 can publish a message on stream "infostream" informing subscriber 32 to reconnect to its original parent 24. Subscriber 32, in response to this published message, would then reconnect to its original parent 24 via an RPC call thereto.

While a hierarchial tree structure of distribution agent processes has been described in the preferred embodiment for illustrative purposes, many other architectures are included within the scope of the invention. The invention can also be used in the context of a group of cooperating processes spanning different types of networks (including local area and wide area networks), different types of machines and using different inter-process communication protocols (i.e., RPCs, sockets, TCP/IP or any other well known inter-process communication protocol). For example, the invention can also be used in the environment of the Internet, which involves a plurality of different network types connecting different types of machines. In embodiments which do not use the tree structure, the "infostream" is used to pass information not between parent and child processes but more broadly information is passed between neighboring processes (i.e., processes which are adjacent to each other and communicate directly with each other using a well-known inter-process communication protocol without going through an intermediary process).

What is claimed is:

1. A publish/subscribe data processing broker network having a plurality of broker computer systems communicating with each other via the network comprising:

means for receiving from a publisher application data messages published on a subject-specific stream by the publisher application where the publisher application originates the messages which are published on the subject-specific stream; and means for distributing the received published data messages to subscriber applications which has requested to receive messages on the stream upon which the published messages were published, the means for distributing including the plurality of broker computer systems and such broker computer systems are arranged in a hierarchical structure including a plurality of ordered levels including a top level closest to publisher applications and a bottom level closest to subscriber applications;

wherein one of the streams is reserved for control messages which are originated and published by a parent publishing broker computer system located at one level of the hierarchy structure and intended for receipt by children subscribing broker computer systems located at a downstream neighboring level of the hierarchy structure, and intended for receipt by subscriber applications if the publishing broker computer systems are located at the bottom level of the hierarchy structure, and the children broker computer systems request an alternative connection to an alternative parent publishing broker computer system which is sibling of said parent publishing broker computer system to receive data message in response to a lost connection to said parent publishing broker computer system in according to a preconfigured policy.

2. The network of claim 1 wherein upon receipt of a message published on the reserved stream, the children subscribing broker computer system or subscriber applications take a predetermined action depending on the contents of the received published message.

3. The apparatus of claim 2 wherein at least one of the publisher applications or the subscriber applications make use of an Internet World Wide Web browser program to allow published messages to be sent or received over the Internet.

4. In a publish/subscribe data processing broker network having a plurality of broker computer systems communicating with each other via the network, a method comprising steps of:

receiving from a publisher application data messages published on a subject-specific stream by the publisher application where the publisher application originates the messages which are published on the subject-specific stream; and distributing the received published data messages to subscriber applications which has requested to receive messages on the stream upon which the published messages were published, the distributing step involving the plurality of broker computer systems and such broker computer systems are arranged in a hierarchical structure including a plurality of ordered levels including a top level closest to publisher applications and a bottom level closest to subscriber applications;

wherein one of the streams is reserved for control messages which are originated and published by a parent publishing broker computer system located at one level of the hierarchy structure and intended for receipt by children subscribing broker computer systems located at a downstream neighboring level of the hierarchy structure, and intended for receipt by subscriber applications if the publishing broker computer systems are located at the bottom level of the hierarchy stucture and the children broker computer systems request an alternative connection to an alternative parent publishing broker computer system which is sibling of said parent publishing broker computer system to receive data message in response to a lost connection to said parent publishing broker computer system in according to a preconfigured policy.

5. A computer program product stored on a computer readable storage medium for, when executed by a computer system, instructing the computer system to carry out the method of claim 4.

\* \* \* \* \*